Dec. 18, 1923.
B. A. SPINNEY
SWEEP RAKE FOR TRACTORS
Filed July 29, 1920   2 Sheets-Sheet 2
1,477,919
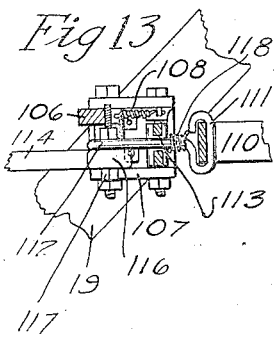
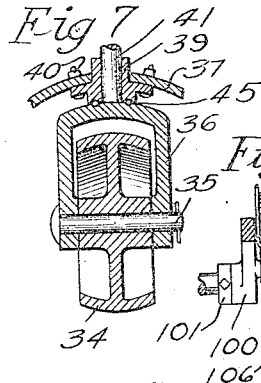
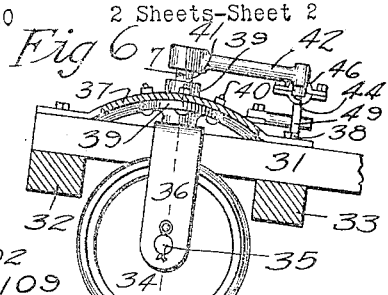
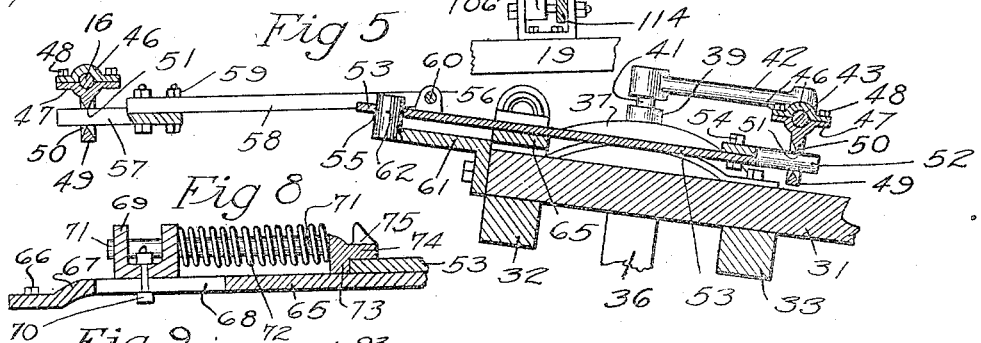
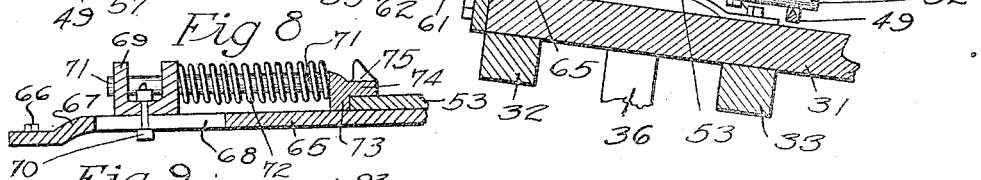
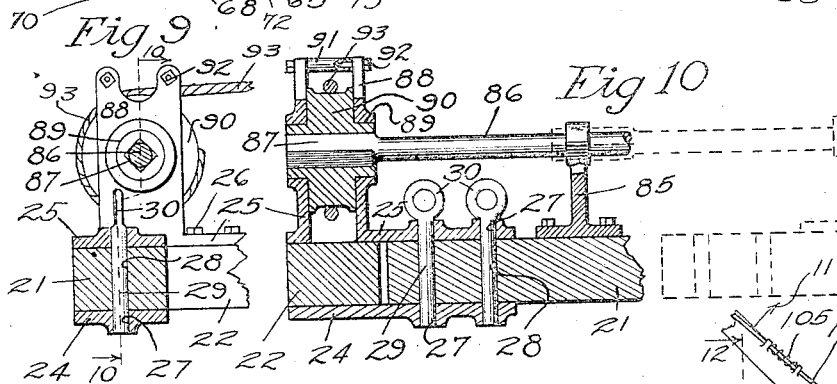
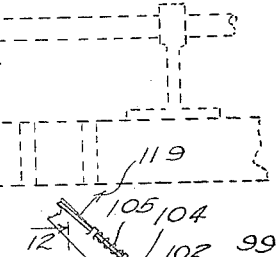
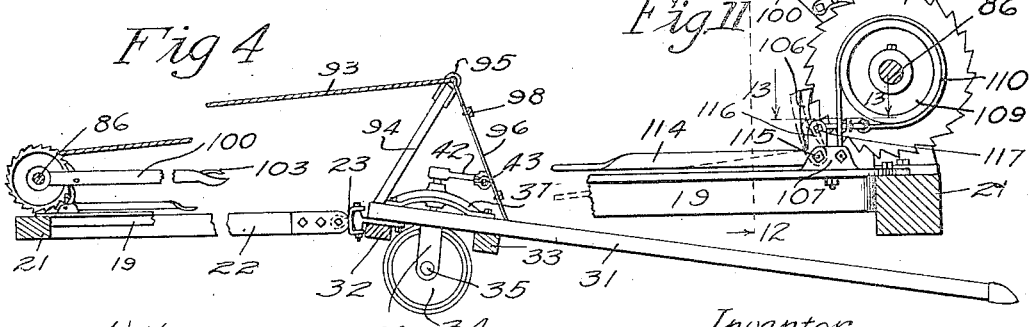
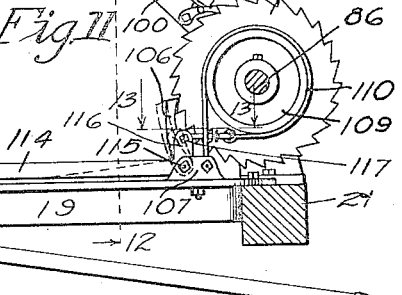
Witness
Lynn Latta
Inventor
Burton A. Spinney
By Bair + Freeman Attorneys Patented Dec. 18, 1923.

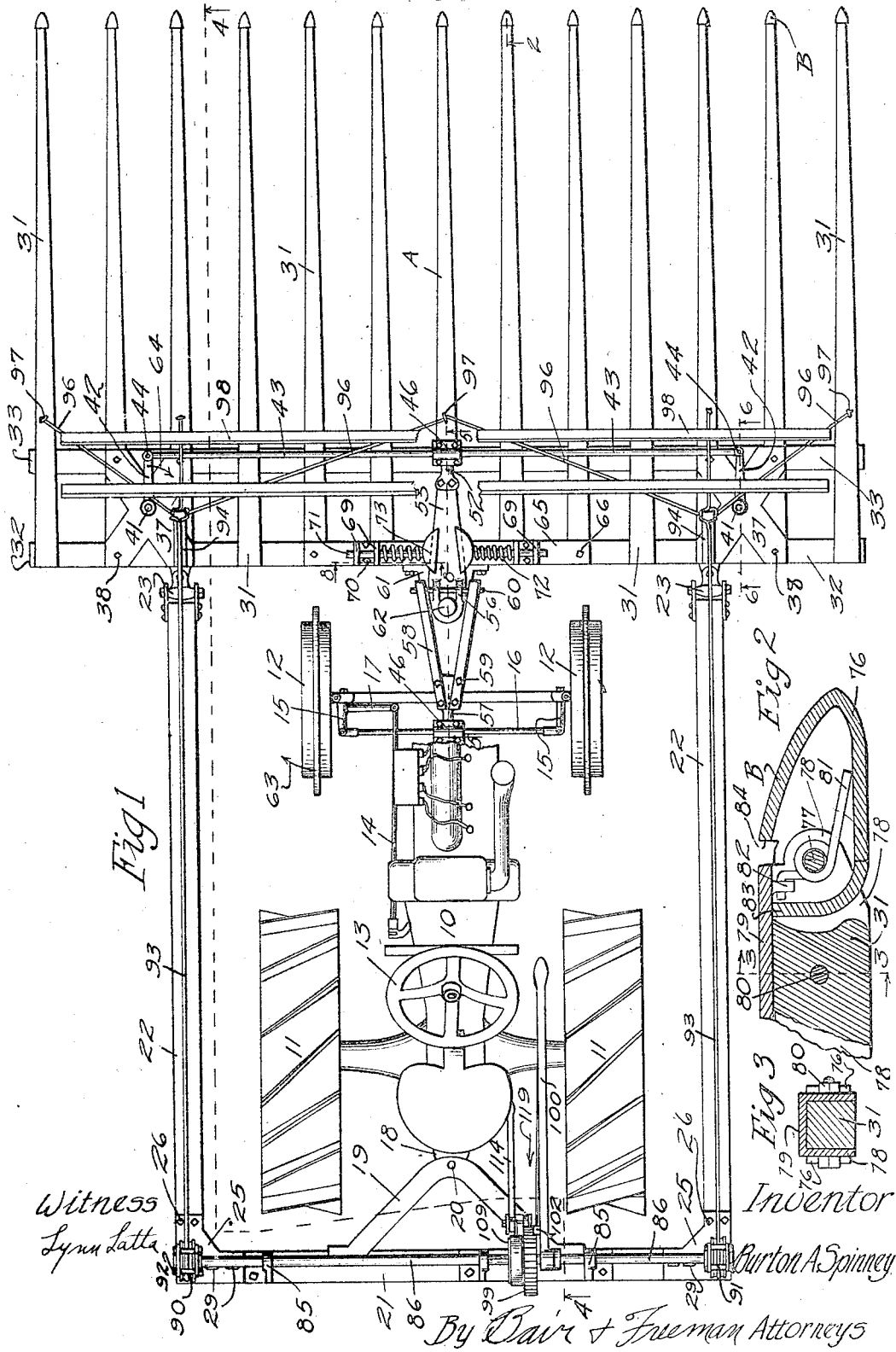

1,477,919

UNITED STATES PATENT OFFICE.

BURTON A. SPINNEY, OF DES MOINES, IOWA.

SWEEP RAKE FOR TRACTORS.

Application filed July 29, 1920. Serial No. 399,680.

*To all whom it may concern:*

Be it known that I, BURTON A. SPINNEY, a citizen of the United States, and a resident of Des Moines, in the county of Polk and State of Iowa, have invented a certain new and useful Sweep Rake for Tractors, of which the following is a specification.

The object of my device is to provide a sweep rake for tractors which is of simple, durable and comparatively inexpensive construction.

More particularly it is my object to provide in such a device an attachment for tractors adapted to operate in unison with the tractor, whereby one operator may control the tractor, as well as the sweep rake.

A further object is to provide a device that may be operated from a tractor, and provided with suitable steering mechanisms so that the steering of the tractor will steer the sweep rake in accordance therewith.

Still a further object is to provide suitable spring actuated mechanisms for tending to hold the sweep rake directly ahead of the tractor.

Still a further object is to provide in such a device suitable connections between the tractor and the sweep rake, for moving the sweep rake, yet the parts being capable of movement independent of the tractor, so as to permit up and down movement, or side movement relative to the tractor, when the device is passing over rough or uneven ground.

In this connection it may be stated that in many instances the ground over which the tractor and sweep rake must pass will be uneven, or one of the wheels of the tractor may travel in a rut, while the remainder of the parts will be substantially higher than that wheel.

In order to accomplish this the steering mechanism from the tractor to the sweep rake must be so provided as to permit movement of the parts independently of each other.

Still a further object is to provide a means for raising and lowering the sweep rake, the means being actuated by a lever device substantially adjacent to the driver's seat.

A further object is to provide a brake device whereby the rake may be gradually lowered from inoperative to operative position, the parts being further arranged so as to permit the detaching of the rake from the tractor in such a way as not to interfere with the lever and brake device which are arranged substantially near the operator of the tractor.

A further object is to provide upon each of the teeth of the sweep rake a shoe, capable of pivotal movement so as to travel over uneven ground.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top plan view of my device attached to a tractor, parts of the tractor being broken away to better illustrate the construction.

Figure 2 shows a sectional view, taken on the line 2—2 of Figure 1.

Figure 3 shows a sectional view, taken on line 3—3 of Figure 2, showing the clamp for holding the shoe on to the end of the sweep rake.

Figure 4 shows a sectional view, taken on line 4—4 of Figure 1.

Figure 5 shows a central, sectional view, taken through the steering mechanism on line 5—5 of Figure 1.

Figure 6 is a sectional view, taken on line 6—6 of Figure 1.

Figure 7 is a sectional view, taken on line 7—7 of Figure 6.

Figure 8 shows a sectional view, taken on line 8—8 of Figure 1.

Figure 9 is a side view of one of the drums that form a part of the raising and lowering device for the rake.

Figure 10 is a sectional view, taken on line 10—10 of Figure 9, one of the positions being shown in dotted lines.

Figure 11 is a detailed, sectional view, showing the brake and lever device for raising and lowering the rake.

Figure 12 is a sectional view, taken on line 12—12 of Figure 11, showing an end elevation of the brake and raising device.

Figure 13 is a horizontal, central, sectional view, taken on line 13—13 of Figure 11.

In the accompanying drawings I have used the reference numeral 10 to indicate an ordinary tractor, preferably of the Fordson type, which is provided with the traction wheels 11, and the steerable wheels 12.

The tractor 10 is provided with a steering wheel 13, which operates the rod 14.

Fixed to the shafts of the steerable wheels 12, is the rearwardly extending spindle 15. Each of the rear ends of the spindle 15 are connected by the link or rod 16. The rod 14 is connected to one of the spindles 15 by means of the member 17.

By rotating the steering wheel 13 the steerable wheels 12 are operated in unison.

The parts just described are of the ordinary type, and form no part of my invention.

The tractor 10 is provided with a hitch device 18, to which is pivoted the yoke member 19 at 20. The yoke member 19 is preferably made of angle iron.

Fixed to the yoke 19 is the horizontal bar 21, which extends in the rear of the traction wheels 11 and projects laterally from each of their sides.

Extending forwardly from the bar 21, and at each side of the tractor 10, are the arms 22. Fixed to each of the forward ends of the arms 22 are the clevises 23, the purposes of which will be more fully described.

I will now describe the means for attaching the rear ends of the arms 22 to the bar 21.

Fixed to each of the rear ends of the arms 22 on their upper and lower surfaces are the plates 24 and 25. The plates 24 and 25 are substantially L shaped. The plates 24 and 25 are rigidly fixed to the arms 22 by means of the bolts 26. The bar 21 has its ends received between the plates 24 and 25.

In order to fix the plates 24 and 25 to the bar 21, I have provided registering openings 27 in the plates 24 and 25. Openings 28 are provided in the bar 21, which register with the openings 27, and through which are extended the pins 29, which are provided with a head 30.

It will be seen from the construction of the parts just described that when the pins 29 are received in the openings 27 and 28, that I have formed a rigid connection between the arms 22 and the bar 21.

Fixed to the front ends of the arms 22 and to the clevises 23, is the sweep rake device A, which is composed of a series of rake teeth 31.

The rake teeth 31 are fixed to a pair of cross-bars 32 and 33.

In order to support the rear end of the rake A, I have provided the caster wheels 34, which are fixed on the shafts 35 within the yoke member 36.

The wheels 34 are provided with a comparatively wide tread surface, which is curved so as to permit easy, free movement and rotation of the wheel 34.

Fixed between a pair of the rake teeth 31 and to the cross-bars 32 and 33 are the housing members 37. The housing members 37 are held in position by means of the bolts 38.

Received within the housing members 37 is the bearing member 39, which is held in place by the bolts 40, as illustrated in Figures 6 and 7 of the drawings.

Extending upwardly from the edge of the yokes 36 is the shank 41. Fixed to the upper end of the shank 41 is the forwardly extending lever 42. Each of the levers 42 are connected by the link 43, by means of the pivoted joints 44.

In order to provide for easy rotation of the yokes 36, I have provided the ball-bearing races 45, as shown in Figure 7 of the drawings.

In order to properly steer the rake in unison with the steerable wheels 12 of the tractor, I have provided the following described mechanism.

Fixed to the link 16 of the tractor is a double clamping member which is composed of the two parts 46 and 47. The clamping members 46 and 47 are held together by the bolts 48.

The clamping member 47 is provided with a downwardly projecting lug 49, in which is formed the opening 50. The opening 50 is tapered from either side so as to form a sharp center portion within the opening at 51.

A clamping member similar to the member fixed on the link 16 is also fixed to the link 43 of the rake A.

Received within the opening 50 of the clamping member on the link 43 is the short shaft 52, which is fixed to a rearwardly extending plate 53 by means of the bolts 54.

The plate 53 is provided near its rear end with an opening 55, and the upwardly extending spaced ears 56.

Received within the opening 50 of the clamping member on the link 16 is the short shaft 57 to which is fixed the forwardly extending arms 58 by means of the bolts 59. The ears 56 are provided with registering openings as are the arms 58.

Extended through the registering openings of the arms 58 and the ears 56 is the pin 60. The pin 60 is directly in line with the clevises 23.

Fixed to the rake A is the bracket 61 which is provided with an upwardly extending pin 62. The pin 62 is received within the opening 55 of the plate 53.

From this it will be seen that the plate 53 is pivoted on the pin 62. Movement of the link 16 will impart movement to the link 43.

The operation of the steering wheel 13 will cause the link or rod 16 to be swung to various positions. The swinging of the rod or link 16 will cause the arms 58 to be also moved. The arms 58 being connected to the plate 53 will cause it to be moved, which in turn will cause the link 43 to be swung. The link 43 being connected to the levers 42 will cause the steerable wheels to be moved correspondingly with the steerable wheels 12 of the tractor. Movement of the wheels 12 will cause the levers 42 to move in the direction indicated by the arrow 64, for moving the wheels of the rake.

The tapering of the openings 50 will permit up and down or side movement of the shafts 52 and 57, thus permitting play of the parts in order to actuate upon various types of fields, yet when the entire clamping member is moved with the link 16, it will cause the clamping member on the link 43 to be moved, thus providing a suitable steering mechanism between the tractor and the sweep rake, which will operate under various conditions.

It will be seen that the arms 58 will be free to swing up and down on the pin 60, independent of the movement of the plate 53, or the plate 53 may move up and down as when the rake is raised or lowered, or when it passes over uneven ground.

The permitting of this movement will not in any way interfere with the steering of the rake.

In order to provide an evener which will tend to cause the sweep rake to travel directly in front of the tractor, I have provided yielding means placed on either side of the plate 53.

The evener device comprises a plate 65 which is fixed to the cross piece 32 by means of the bolts 66. The plate 65 is slightly curved at 67 and is provided with the elongated slots 68.

Slidably mounted upon the plate 65 are the double bearing members 69. The double bearing members 69 are secured to the plate 65 by means of the bolt 70, which is capable of sliding movement within the slots 68.

The double bearing member 69 is provided with registering openings in which is received the shaft 71, on which is mounted the spring 72.

The end of the shaft 71, opposite from the double bearing member 69 is provided with a head 73. The head 73 is provided with a shoulder 74. The shoulder 74 is designed to rest against the side edges of the plate 53, as shown in Figures 1 and 8 of the drawings.

The head 73 is provided with a portion 75 against which the operator's foot may be placed when he desires to move the shaft 71 against the action of the spring which releases it from the plate 53. The spring 72 rests against the double bearing member 69 and the head 73.

From the construction of the parts just described it will be seen that the yielding means on either side of the plate 53 will tend to cause the wheels 34 of the rake A to travel directly ahead of and in a plane parallel to the steerable wheels 12 of the tractor.

It will be understood that the entire device, which is fixed to the tractor hitch 18 by means of the pin 20, will be capable of slight pivotal movement relative to the tractor on the pin 20. But the yielding device on either side of the plate 53 will tend to hold the rake normally in position, and prevent any pivotal movement independent of the tractor, yet permit the parts to swing or move to various positions when they pass over fields that are rough. The springs, however, bring the parts back to their normal position.

When it is desired to detach the rake from the tractor the pins 29 are removed and the rear ends of the arms 22 are swung outwardly a short distance on the clevises 23. The bar 21 and the yoke 19 remaining on the tractor.

The tractor may then be moved rearwardly away from the rake. It will be understood that the shaft 57 will simply slide out of the opening 50 of the clamping member on the link 16 as the tractor is moved rearwardly.

When it is desired to disassemble the steering mechanism between the tractor and the sweep rake, the operator places his foot on the portion 75 of the head 73, until the shoulder 74 is cleared from the plate 53. The plate 53 may then be raised or swung upwardly until it disengages the pin 62.

It will be seen that this part of the device may readily and easily be assembled or disassembled.

The movement of the double bearing member 69 makes it possible to vary the tension of the springs 72, so as to make the plate 53 move easy or harder as is desired.

Each of the rake teeth 31 are provided at their forward ends with a shoe B. The shoe B comprises a member 76 which is provided with a curved under surface so as to easily travel over the ground.

The member 76 is provided on its rear side with a pair of slots which receive the side plates 78 of the member 79, which is fixed to the rake tooth by means of the bolts 80. This places the shoe B on the outside of the member 79 so that no hay or other foliage will gather on it.

A spring device 81, which has one end fixed to the member 79 at 82 is wrapped around the shaft 77, and has its free end resting against the forward end of the shoe 76. This will tend to yieldingly hold the shoe 76 downwardly.

The rear portion 83 of the shoe 76, which strikes against the upper side of the member 79 limits the movement of the shoe 76 in one direction.

The upper side of the shoe 76 is provided with an open portion so as to form an edge 84, which will strike against the forward edge of the member 79, thus limiting the pivotal movement of the shoe 76 in the opposite direction.

In order to provide suitable mechanism for raising and lowering the rake, I have provided a plurality of bearing members 85, which are fixed on the bar 21. Extending through the bearing members 85 is the shaft 86 which has its ends squared as at 87.

Formed on the plates 25 are the upwardly extending bearing members 88. The bearing members 88 are provided with openings 89. Mounted between the bearing members 88 and received between the openings 89 is the drum 90, which is provided with a squared opening which receives the squared end 87 of the shaft 86.

In order to hold the bearings 88 together, I have provided a sleeve 91 through which is extended the bolt 92. The sleeve acts as a spacing member for holding the two parts of the bearing 88 apart while the bolt 92 will prevent any movement of them.

Fixed to each of the drums 90 is the cable 93. On the rake A near the rear end thereof are the upwardly extending brackets 94, which are provided at their upper ends with the U shaped members 95.

The cable 93 extends forwardly from the drums 90, and are fastened to the U shaped members 95 at their forward ends.

In order to reinforce the brackets 94 I have provided a cable 96 which is fastened to the rake at 97. The ends of the cable, which are fastened to the rake at 97 extend forwardly and sidewardly from the brackets 94, thus reinforcing them.

When the shaft 86 is rotated it will be seen that the cable 93 will be wound thereon, thus causing the rake to be raised off of the ground.

The clevises 23 and the pin 60 act as a hinge for accomplishing this.

A pair of cross slats 98 are fixed to the reinforcing cable 96 so as to prevent any hay from passing on through the operating mechanism of the device.

In order to control the up and down movement of the rake A I have a ratchet 99 fixed to the shaft 86. A lever 100 is loosely mounted on the shaft 86 and is held in place by means of the collar 101. The lever 100 is provided with a pawl 102, which is designed to normally engage the ratchet 99.

In order to release the pawl 102 from engagement with the ratchet 99 the hand engaging lever 103 is provided, which is connected to the pawl 102 by means of the wire 104. The spring 105 normally holds the pawl in engagement with the ratchet 99.

In order to lock the ratchet against rotation in one direction so that when the rake A is raised it will be held in its raised position, I have provided the pawl 106.

The pawl 106 is mounted in a suitable bearing 107, which is fixed to the yoke member 19. In order to hold the pawl 106 in engagement with the ratchet 99 a spring 108 is provided fixed to the bearing 107.

On the shaft 86 is the brake drum 109. Extending around the brake drum is the brake band 110. One end of the brake band 110 is fixed in the bearing 107 and the opposite end of the brake band is curved and connected to a hook 111 formed on the rod 112.

The rod 112 extends through a slot 113 formed within the brake band 110. A foot lever 114 is pivoted on the bolt 115. The foot lever 114 is provided with a short upwardly extending projection 116 to which is bolted the end of the rod 112 by means of the bolt 117. The bolt 117 has one of its ends extended away from the member 116 and is received between the ratchet 99 and rests against the pawl 106.

A coil spring 118 is mounted on the rod 112 between one end of the brake band 110 and the hook 111. This will tend to hold the foot lever 114 in its raised position, thus causing the band 110 to be loose on the drum 109.

From the construction of the parts just described it will be seen that movement of the hand lever 100 in the direction indicated by the arrow 119, will cause the cable to be wound upon the drums 90, thus causing the rake A to be lifted off the ground.

The pawl 106 will prevent the weight of the rake from causing it to move downwardly and rest upon the ground.

It will be understood that the hand lever 100 is loosely mounted on the shaft 86 so that an oscillating movement of the lever 100 will cause the shaft 86 to be rotated.

When it is desired to lower the load that is on the rake it will be necessary to lower it gently so as to prevent breaking of it.

In order to accomplish this the brake device is used. The operator places his foot on the lever 114 and moving it to the position shown in dotted lines in Figure 11 of the drawings will cause the end of the bolt 117 to strike against the pawl 106 thus moving the pawl out of engagement with the ratchet 99.

However, as soon as the pawl 106 is disengaged the brake device will be put into operation thus preventing the load from pulling the rake downwardly.

However, the releasing of the great amount of pressure on the lever 114 slightly will permit the brake band to disengage the brake drum and thus permit the load to move slowly downward.

It will be seen that the releasing of the brake sufficiently to permit the rake to lower will not in any way permit the movement of the pawl 106 sufficiently to engage the ratchet 99.

If the operator desires he can during the lowering of the rake engage the hand lever 100 and cause the pawl 102 to disengage the ratchet 99.

When the entire device is detached from the tractor the squared end 87 of the shaft 86 is simply withdrawn from the drums 90 to the position shown in dotted lines in Figure 10 of the drawings.

The advantages of my device are that I am able to raise and lower the rake and at all times have absolute control of it.

Another advantage is the method of detaching the device from the tractor when it is desired to use the tractor independently of the hay rake.

Another advantage of my device is the steering mechanism and the simple method of attaching it to the tractor.

In this connection it will be understood that when the device has been detached and it is desired to fix the rake to the tractor, the tractor is driven in between the arms 22. Then the short shaft 57 is placed into the opening 50. It may be that the rake will be a few inches out of line, but as soon as the tractor is driven over the ground the springs 72 will cause the rake to become centered directly in front of the tractor.

It will be understood that my device can be used for gathering hay, straw, alfalfa or other foliage crops, because the driving of the rake by the tractor gives me the variation of power that is required to operate in different kinds of fields and upon different kinds of crops.

Some changes may be made in the construction and arrangement of my improved device without departing from the real purpose and spirit of my invention, and it is my intention to cover by my claims any modified forms of structure or use of mechanical equivalents, which may be reasonably included within their scope.

I claim as my invention:

1. The combination of a motor driven vehicle having a steering mechanism thereon and a wheel supported sweep rake, means for connecting said vehicle with the sweep rake, and means for steering said sweep rake and said vehicle for causing the steerable wheels of the vehicle and the wheels of the sweep rake to be steered in unison, said first means being positioned midway between the pair of steerable wheels of the vehicle and the pair of steerable wheels of the sweep rake.

2. The combination of a tractor having a pair of steerable wheels thereon connected together by a link for steering them in unison, with a sweep rake arranged forwardly of said tractor, means for pivotally connecting said sweep rake with said tractor, said sweep rake having a pair of steerable wheels thereon connected together by a link, means for connecting the link of the steerable wheels of the tractor to the link of the steerable wheels of the sweep rake for steering said sweep rake from said tractor.

3. The combination of a tractor having a pair of steerable wheels thereon, connected together by a link for steering them in unison, with a sweep rake arranged forwardly of said tractor, means for pivotally connecting said sweep rake with said tractor, said sweep rake having a pair of steerable wheels thereon connected together by a link, means for connecting the link of the steerable wheels of the tractor to the link of the steerable wheels of the sweep rake for steering said sweep rake from said tractor and means for tilting said sweep rake from said tractor.

4. The combination of a tractor having a steering mechanism thereon and a sweep rake mounted on steerable wheels, means for operatively connecting the steering mechanism of the tractor with the steerable wheels of the sweep rake, said means including a member pivoted to the sweep rake and fixed to the steering mechanism of the sweep rake, and a member pivoted to said last member and fixed to the steering mechanism of the tractor the parts being so arranged that movement of the sweep rake in any direction will not affect the steering mechanism.

5. The combination of a tractor having a steering mechanism thereon and a sweep rake mounted on steerable wheels, means for operatively connecting the steering mechanism of the tractor with the steerable wheels of the sweep rake whereby the operation of the steering mechanism of the tractor will operate the steering mechanism of the sweep rake in unison therewith, the parts being so arranged that slight movement in any direction will be permitted without affecting the operation of the steering mechanism.

6. The combination of a tractor having a steering mechanism with a sweep rake arranged forwardly of said tractor and having steering means thereon, cooperating steering means for connecting the steering means of the sweep rake with the steering mechanism of the tractor, means for steering said sweep rake from said tractor and means for yieldingly holding said sweep rake directly in front of said tractor.

7. The combination of a tractor having a steering mechanism thereon and a wheel mounted sweep rake, having a steering mechanism thereon, auxiliary steering mechanism operatively connecting the steering mechanism of the tractor and sweep rake together, means for yieldingly holding the auxiliary steering mechanism in position so that the sweep rake will travel directly in front of the tractor.

8. The combination of a tractor having a steering mechanism thereon and a wheel mounted sweep rake having a steering mechanism thereon, auxiliary steering mechanism operatively connecting the steering mechanism of the tractor and sweep rake together, means for yieldingly holding the auxilary steering mechanism in position so that the sweep rake will travel directly in front of the tractor, said last means including a pair of spring devices adapted to rest against said auxiliary steering mechanism.

9. The combination of a tractor having a steering mechanism thereon and a wheel mounted sweep rake having a steering mechanism thereon, auxiliary steering mechanism operatively connecting the steering mechanism of the tractor and sweep rake together, means for yieldingly holding the auxiliary steering mechanism in position so that the sweep rake will travel directly in front of the tractor, means for raising or lowering said sweep rake from the tractor and means for locking said sweep rake in any of its positions.

10. The combination of a tractor having a steering mechanism thereon and a wheel mounted sweep rake having a steering mechanism thereon, auxiliary steering mechanism operatively connecting the steering mechanism of the tractor and sweep rake together, means for yieldingly holding the auxiliary steering mechanism in position so that the sweep rake will travel directly in front of the tractor, means for raising said sweep rake, and for locking it in any of its raised positions, and a lever device for lowering said sweep rake.

11. The combination of a tractor having a steering mechanism thereon and a wheel mounted sweep rake having a steering mechanism thereon, auxiliary steering mechanism operatively connecting the steering mechanism of the tractor and sweep rake together, means for yieldingly holding the auxiliary steering mechanism in position so that the sweep rake will travel directly in front of the tractor, means for raising said sweep rake and for locking it in any of its raised positions, and a brake device for gradually lowering said sweep rake.

12. The combination of a tractor having a steering mechanism thereon and a wheel mounted sweep rake having a steering mechanism thereon, auxiliary steering mechanism operatively connecting the steering mechanism of the tractor and sweep rake together, means for yieldingly holding the auxiliary steering mechanism in position so that the sweep rake will travel directly in front of the tractor, means for raising said sweep rake and for locking it in any of its raised positions, a brake device for gradually lowering said sweep rake, and a lever device for operating said brake device.

13. The combination of a tractor having a steering mechanism thereon and a wheel mounted sweep rake having a steering mechanism thereon, auxiliary steering mechanism operatively connecting the steering mechanism of the tractor and sweep rake together, means for yieldingly holding the auxiliary steering mechanism in position so that the sweep rake will travel directly in front of the tractor, means for manually raising said sweep rake and a ratchet device for holding said sweep rake in its raised position and means for manually rendering said ratchet device inoperative.

14. The combination of a tractor having a steering mechanism thereon and a wheel mounted sweep rake having a steering mechanism thereon, auxiliary steering mechanism operatively connecting the steering mechanism of the tractor and sweep rake together, means for yieldingly holding the auxiliary steering mechanism in position so that the sweep rake will travel directly in front of the tractor, means for manually raising said sweep rake, and a ratchet device for holding said sweep rake in its raised position, a brake device for holding the sweep rake in its raised position, and a lever for throwing said ratchet device out of engagement and for simultaneously rendering said brake device operative.

Des Moines, Iowa, July 22, 1920.

BURTON A. SPINNEY.